April 28, 1959     W. J. McMILLAN ET AL     2,884,386
CYCLIC FOAMING METHOD OF MAKING CELLULAR PLASTIC BODIES
Filed Sept. 24, 1956
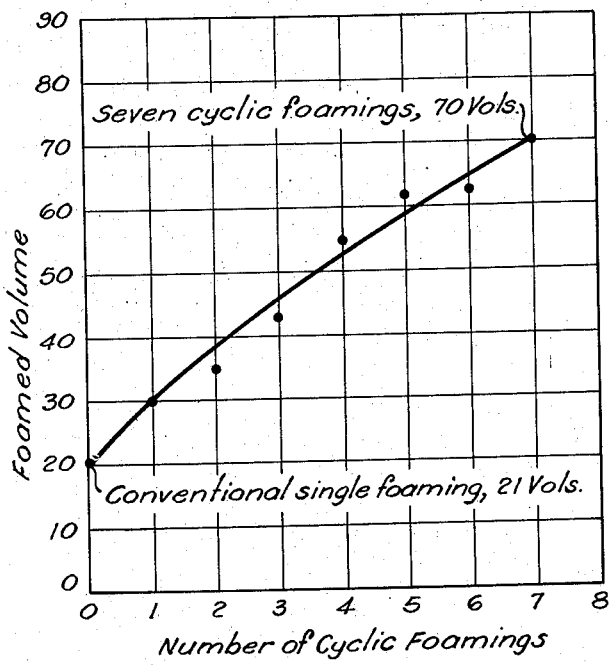
INVENTORS.
William J. McMillan
Keith R. Denslow
BY
Griswold & Burdick
ATTORNEYS

United States Patent Office 2,884,386
Patented Apr. 28, 1959

2,884,386

CYCLIC FOAMING METHOD OF MAKING CELLULAR PLASTIC BODIES

William J. McMillan, Midland, and Keith R. Denslow, Coleman, Mich., assignors to The Dow Chemical Company, Midland, Mich., a corporation of Delaware Application September 24, 1956, Serial No. 611,683

7 Claims. (Cl. 260—2.5)

This invention concerns an improved method of making cellular bodies of organic thermoplastic materials, such as are often termed "plastic foams." The method of the invention permits expansion of an intimate mixture of a non-cellular thermoplastic resin and a normally gaseous "blowing agent" to form a cellular thermoplastic body having a greater volume, and a lower average density, than would theoretically be obtainable through the expanding action by itself of the gaseous blowing agent initially present. It involves a cycle of expanding operations than can be applied repeatedly to cause further swelling of plastic foams made in accordance therewith. Because of this, it has come to be known as the "cycle-foaming" method.

It is known that plastic foams can be made by intimately incorporating a blowing agent within a body of a thermoplastic resin and thereafter bringing the body to a heat-plastifying or softening temperature and forming or expanding a gas, e.g., by heating, vaporizing or thermally decomposing the blowing agent, which expands the thermoplastic body to produce a foam composed for the most part of individually closed cells having thin walls of the thermoplastic resin. The blowing agent can be a solid chemical agent, such as ammonium carbonate, or any of a variety of organic azo compounds, that are decomposable to form a gas at the heat-plastifying temperature to which the resin is brought, or it can be a liquid such as water, pentane, or hexane, etc., that becomes vaporized during the operation of heat-plastifying the resin body; or it can be a normally gaseous substance such as methyl chloride, carbon dioxide, dichlorodifluoromethane, trichloromonofluoromethane, monochlorotrifluoromethane, propylene, butylene, etc. that is capable of being dissolved in or otherwise intimately incorporated together with the non-cellular body of resin and thereafter vaporized or otherwise expanded to swell the mass and form the plastic foam.

A number of methods of incorporating blowing agents into thermoplastic organic bodies and of generating a gas or vapor from such agents to expand the bodies and form plastic foams are known. Cellular polystyrene is manufactured by dissolving methyl chloride in polystyrene at superatmospheric pressure, and usually at an elevated temperature of from 80° to 100° C., or thereabout, to form a flowable gel and extruding the gel into a zone of lower pressure so as to vaporize the methyl chloride and thereby simultaneously expand and cool the polystyrene to form the solid foam. It is known that in order to form a stable foam of good quality by this method, it is necessary that the gel be at a temperature below the critical temperature of the methyl chloride immediately prior to being extruded and that the proportion of methyl chloride present in the gel be such as to be fully vaporized upon release of the pressure with resulting cooling (due to its heat of vaporization and expansion) of the resin to a temperature in the vicinity of, or below, the heat distortion temperature of the resin. Otherwise, the plastic foams thus formed often collapse, or become badly distorted, on standing. Even when properly prepared as just described, a solid foam of polystyrene shrinks or collapses upon being heated to above the heat distortion, or second order transition temperature of the polystyrene, e.g., to 100° C., or higher, for a substantial time.

It has now been found that when a normally gaseous blowing agent, used in admixture with an organic thermoplastic material to make a plastic foam, is one that is a poor solvent, or a non-solvent, for the thermoplastic material and does not readily or rapidly permeate membranes of the thermoplastic material, the plastic foam can be brought, upon cooling while in contact with air or other suitable gas having a permeability rate greater than the entrapped, gaseous foaming agent, to a volume greater than would theoretically be possible if the expansion were due solely to the heat expansion of the initially added gaseous blowing agent. It has also been found that a plastic foam, initially formed from the starting materials just mentioned, can be further expanded in a step-wise manner by alternately contacting the foam with air or other gas having a permeability rate through its cell walls greater than the initial gaseous blowing agent, heating the foam to a heat-plastifying or softening temperature of the resin, but below a temperature at which the foam would be collapsed or the resin would be thermally decomposed, and cooling in the presence of such more permeable gas.

It has further been found that when operating as just described, air, for example, permeates through the cell walls of the plastic foam whereby a condition is approached, or reached, at which the partial pressure of air inside of the cells equals the pressure of air on the outer surfaces of the plastic foam body. Since the total gas pressure inside of the cells is the sum of the partial pressure of the air and the partial pressure of the gas from the residual initially used blowing agent, the total gas pressure inside of the plastic foam body exceeds the pressure of air on the outer surfaces of the body when the condition of equilibrium is reached. The proportion of air inside of the cells can be increased by lowering the temperature of the plastic foam body prior to or during the step of absorbing the air or by increasing the pressure of air on the outer surfaces of the plastic foam body during said step, or by a combination of these operations. After air has permeated into the plastic foam body above, at and below a heat-plastifying or softening temperature of the thermoplastic walls of the body, the latter can be heated again to a heat plastifying temperature and thus permit expansion of the cells by the gases within the latter. The plastic foam can then be cooled, or be permitted to cool, to below a heat-plastifying temperature of the cell walls, so as to again have further permeation of air through the expanded cell walls and to end up, upon cooling, with a foamed mass having a volume exceeding that attributable to the heat expansion of the primary gas alone, prior to the permeation by the second gas.

It has still further been found that two or more bodies of a plastic foam prepared as described above can be bonded together into a single body by being pressed against one another, e.g., in a mold provided with air vents, while at a temperature sufficient to heat-plastify the cell walls of the foamed bodies. For instance, granules of a thermoplastic resin and a suitable gaseous blowing agent can be expanded individually to provide a plurality of loose, unbonded, masses thereof, in the above manner until they are nearly of as great a total volume as desired. They can then be poured into a vented mold and further expanded so as to fill the mold and the plurality of masses can be pressed together, e.g., due to the further expansion within the mold, with the formation of a single, shaped, plastic foamed article.

The preferred primary blowing agent, by which is meant the normally gaseous foaming agent which is used to make the primary or first foamed product, is dichlorodifluoromethane. Other normally gaseous primary blowing agents which can be used include monochlorodifluoromethane, symmetrical dichlorotetrafluoroethane and other gases having as physical properties no solvent effect or a poor solvent effect upon the organic thermoplastic to be foamed, and having a permeability rate less than that of air or other secondary blowing agents through a membrane of the thermoplastic mass to be foamed.

The preferred secondary blowing agent is air, which has a permeability rate greater than monochlorodifluoromethane, dichlorodifluoromethane, dichlorotetrafluoroethane or other primary blowing agents. Other useful secondary blowing agents include helium, nitrogen, carbon dioxide, etc. which have a permeability rate greater than that of the primary blowing agent.

Any amorphous thermoplastic resin which can be foamed to give a stable foamed product and does not crystallize upon repeated heating to a heat-plastifying temperature can be used in the cyclic foaming process. Such thermoplastics are well-known in the art and include polymeric styrene, by which is meant polystyrene and interpolymers and copolymers of styrene with other monomers such as vinyltoluene and polymers and copolymers of styrene slightly cross-linked with divinylbenzene; polyvinyltoluene; polydichlorostyrene; polymethylmethacrylate; etc.

In practice, any known method can be used for incorporating a normally gaseous foaming agent having little or no solvent action on the thermoplastic to be foamed, and foaming it. Thereafter the primary foamed product is heated to a heat-plastifying or softening temperature of the thermoplastic resin but below a temperature at which the foam would be collapsed or the resin would be thermally decomposed, advantageously for a time between about 45 seconds and 3 minutes or more to plastify the resin, and the primary foamed product is exposed to an air atmosphere, for example, and cooled or permitted to cool with continued exposure to an air atmosphere. Air thereby permeates the heat-expanded cell walls of the foamed resin and the amount of entrapped gases is increased. The cycles of heating and cooling, with exposure to air, are repeated to get a foamed product having the desired properties of density and strength, the volumetric increase of the foamed resin progressing in proportion to the number of cycles, as aforesaid, with a progressive decrease in the density of the foamed product. Foamed cellular masses having a density as low as 0.2 lb. per cubic foot can be obtained by such procedures. The primary foamed mass may be exposed to a plurality of such secondary gaseous blowing agents, either in combination or seriatim, advantageously above, at, or below the heat-plastifying temperature, or a combination thereof. Advantageously, the foamed product is cyclically heated to as much as 75° C. above the heat-plastifying or softening point of the thermoplastic resin. The preferred temperature range for non-cross-linked thermoplastics is 40° C. above the heat-plastifying or softening point, and for slightly cross-linked thermoplastics is about 70° C. above such point. For polystyrene, the preferred heating temperature is about 120° C. For all foamed thermoplastics, the temperature of choice appears to be just below the temperature at which the foam would be collapsed. This temperature can readily be determined by a simple trial. In addition to air, other secondary foaming agents which have a permeability rate at room and elevated temperatures greater than that of the primary foaming agent can be used. These include helium, nitrogen, carbon dioxide, etc. The time between heat foamings should be sufficient to give substantial diffusion of secondary foaming agents into the heat-expanded foamed mass. This can readily be determined by trial. When 1/32 in. foaming-in-place polymeric styrene granules are used, at least 3 foaming cycles at 5 hour intervals are advantageous. During the waiting period when the outside gas diffuses into the foamed particle or article, the outside pressure should not exceed the compressive strength of the foamed material. Atmospheric or substantially atmospheric pressure is generally preferred.

The following examples represent specific embodiments of the invention and the advantageous results derived therefrom.

By "foamed volume," as used hereinafter, is meant the ratio of the final volume to the original volume of the material being cycle foamed.

Example 1

A quantity of 0.45 g. of a copolymer of 94.92 percent styrene, 5 percent of GR–S rubber (a copolymer of 76.5 percent butadiene and 23.5 percent styrene) and 0.08 percent of divinylbenzene was pressurized with dichlorodifluoromethane to contain 1.99 percent by weight of dichlorodifluoromethane. The pressurized copolymer was heated for 2 minutes at 130° C. for 8 successive times and exposed to an air atmosphere with a waiting period between heatings of 30 minutes. The final foamed volume was 18 volumes. A control having the same formulation was heated by conventional practice, once, for 16 minutes. The foamed volume, upon cooling, was 9 volumes. Accordingly, the cycle foaming process gave a foamed product having twice the volume obtainable by the conventional foaming procedure.

Example 2

A quantity of 0.45 g. of molding grade polystyrene containing a small amount of rubbery butadiene-styrene copolymer was pressurized with dichlorodifluoromethane until it contained 8.11 percent thereof, and was heated for 2 minute periods at 120° C. and exposed to an air atmosphere for 9 consecutive times with waiting periods between heatings of ½ hour to 2 days. The final foamed volume was 150 volumes. The theoretical foamed volume for the contained dichlorodifluoromethane per se was 24 volumes. Therefore, the cyclic method of foaming gave a foamed product having about 6 times the volume theoretically obtainable by the conventional foaming procedure.

Example 3

A quantity of 0.45 g. of monochlorodifluoromethane-impregnated foamed molding grade polystyrene was heated for 2 minutes at 120° C. and exposed to air for 7 consecutive times, with a waiting period of 1 day between heatings. Initial foamed volume was 21. Final foamed volume was 70. The cycle method of foaming, accordingly, gave about 3½ times the foamed volume obtainable conventionally. A graphic representation comparing the results of this process with the conventional control is shown in the drawing.

Example 4

Methylmethacrylate monomer containing 2 percent benzoyl peroxide catalyst was polymerized in the presence of 20 percent by volume (excess) of dichlorodifluoromethane at 80° C. for 17 hours. When foamed at 125° C. for 150 seconds in a still air oven, a mass having a foamed volume of 3.84 and a density of 16.2 lbs./cu. ft. was obtained. When reheated at 155° C. for 180 seconds and allowed to cool in the presence of an air atmosphere for 48 hours, a mass having a foamed volume of 17.4 and a density of 3.58 lb./cu.. ft was obtained. When again reheated to 155° C. for 75 seconds and allowed to cool in the presence of air for 7 days, a mass having a foamed volume of 66.5 and a density of 0.938 lb./cu. ft. was obtained.

Example 5

Methylmethacrylate monomer containing 0.2 percent benzoyl peroxide catalyst and 0.06 percent ethylene glycol dimethacrylate as cross-linking agent was polymerized at 80° C. for 48 hours in the presence of 20 percent by volume (excess) of dichlorodifluoromethane. When foamed at 140° C. for 150 seconds a mass was obtained having a foamed volume of 3.71 and a density of 16.8 lb./cu. ft. When reheated to 155° C. for 180 seconds and allowed to cool in the presence of air for 24 hours, a mass having a foamed volume of 8.11 and a density of 7.69 lb./cu. ft. was obtained. When again reheated to 150° C. for 180 seconds and allowed to cool in the presence of air for 72 hours a mass having a foamed volume of 9.66 and a density of 6.45 lb./cu. ft. it was obtained.

Example 6

Polyvinyltoluene beads were pressurized with an excess of dichlorodifluoromethane at 80° C. for 16 hours. When foamed at 130° C. for 90 seconds and allowed to cool in the presence of air, a mass having a foamed volume of 28.7 and a density of 2.17 lb./cu. ft. was obtained. A second foaming at 130° C. for 45 seconds and cooling in the presence of air for 72 hours gave a mass having a foamed volume of 35.9 and a density of 1.73 lb./cu. ft. A third foaming at 130° C. for 40 seconds and cooling in the presence of air for 24 hours gave a mass having a foamed volume of 44.6 and a density of 1.39 lb./cu. ft.

Example 7

A piece of molding grade polystyrene film 1 mil x 1½ in. x 12 in. was pressurized for 3 hours at 90° C. with excess dichlorodifluoromethane. When cooled and removed from the bomb, the sheet had shrunk to a twisted ribbon approximately ⅛ in. x ⅛ in. x 4 in. When foamed at 135° C. for 30 seconds, the sheet had a foamed volume of 58, a density of 1.07 lb./cu. ft., and had the dimensions ½ in. x 3/16 in. x 14 in. After 10 days' exposure in an air atmosphere, the sheet was again foamed at 145° C. for 40 seconds and a product having a foamed volume of 78.3 and a density of 0.797 lb./cu. ft. was obtained. After standing for 24 hours in an air atmosphere, the sheet so obtained was foamed at 125° C. for 45 seconds and there was obtained a product having a foamed volume of 95.8 and a density of 0.651 lb./cu. ft.

Example 8

A molded rectilinear parallelepiped of polystyrene ½ in. x 3/16 in. x 1½ in. was pressurized for 17 hours at 90° C. with excess dichlorodifluoromethane. When foamed at 140° C. for 180 seconds, there was obtained a product having a foamed volume of 40 and a density of 1.56 lb./cu. ft. After 5 days' exposure to an air atmosphere, the product was heated to 125° C. for 135 seconds and there was obtained a further expanded product having a foamed volume of 69.9 and a density of 0.892 lb./cu. ft. After 10 days' exposure to an air atmosphere, a further heating at 135° C. for 120 seconds gave a product having a foamed volume of 112 and a density of 0.558 lb./cu. ft. The product so obtained was a regular enlargement of the original rectilinear parallelepiped.

What is claimed is:

1. A method for increasing the foamed volume of a closed cell, foamed, thermoplastic resin mass of the group consisting of styrene homopolymers and copolymers, poly(vinyltoluene), polydichlorostyrene and poly(methyl methacrylate); which contains in its cells a gas which is a non-solvent or a poor solvent for such resin which method consists in heating such foamed mass to a heat-softening temperature for a time sufficient to soften the resin but below a temperature where the foam would be collapsed or the resin would be decomposed to expand such foamed mass and cooling while exposing said heat expanded mass to an atmosphere of a gas which has a permeability rate greater than the permeability rate of the primary foaming gas through the cell walls of the foamed mass, and repeating said cycles of heating and cooling while exposing to an atmosphere of said second more permeable gas for a plurality of cycles whereby the volume of the foamed mass is continually increased to a desired volume in excess of that obtainable from the heat expansion of the primary gas alone.

2. The method of claim 1 wherein the primary foaming agent is dichlorodifluoromethane.

3. The method of claim 2 in which the secondary foaming agent is air.

4. The method of claim 3 wherein the thermoplastic resin is a polymeric styrene.

5. The method of claim 4 wherein the foamed resin mass is heated to about 120° C.

6. The method of claim 5 wherein 1/32 in. granules of a polymeric styrene are used in making the primary foamed resin mass and wherein the cyclic refoaming periods approximate 5 hours.

7. The method of claim 6 wherein the cyclic refoaming is repeated at least three times.

References Cited in the file of this patent

UNITED STATES PATENTS

| 2,532,242 | Ott | Nov. 28, 1950 |
| 2,697,255 | Lindemann | Dec. 21, 1954 |

OTHER REFERENCES

"Dylite Expandable Polystyrene," by Koppers Company Inc.; copyright, 1954; page 3.